(12) United States Patent
Naribole et al.

(10) Patent No.: US 11,357,025 B2
(45) Date of Patent: Jun. 7, 2022

(54) MULTI LINK TXOP AGGREGATION

(71) Applicant: Samsung Electronics Co., Ltd., Suwon-si (KR)

(72) Inventors: Sharan Naribole, San Jose, CA (US); Srinivas Kandala, Morgan Hill, CA (US); Wook Bong Lee, San Jose, CA (US); Ashok Ranganath, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/945,608

(22) Filed: Jul. 31, 2020

(65) Prior Publication Data

US 2021/0076398 A1 Mar. 11, 2021

Related U.S. Application Data

(60) Provisional application No. 63/021,069, filed on May 6, 2020, provisional application No. 62/992,719, filed on Mar. 20, 2020, provisional application No. 62/989,386, filed on Mar. 13, 2020, provisional application No. 62/959,414, filed on Jan. 10, 2020, (Continued)

(51) Int. Cl.
*H04W 4/00* (2018.01)
*H04W 72/12* (2009.01)
*H04W 24/08* (2009.01)

(52) U.S. Cl.
CPC ....... *H04W 72/1257* (2013.01); *H04W 24/08* (2013.01)

(58) Field of Classification Search
USPC .................................. 370/328, 329, 330, 331
See application file for complete search history.

(56) References Cited

U.S. PATENT DOCUMENTS 10,506,553 B2    12/2019   Ahn et al.
10,542,526 B2    1/2020    Seok
(Continued)

FOREIGN PATENT DOCUMENTS

WO    WO-2015136316 A1 *   9/2015    ........ H04W 74/0816
WO    WO-2021004404 A1 *   1/2021    ............ H04W 74/02

OTHER PUBLICATIONS

Orfanos, Georgios, et at, "A new Distributed Coordination Function for W-LANs with multiple channel structure," Proceedings of 14th IST Mobile & Wireless Communications Summit, Jun. 2005, 5 pages.

(Continued)

*Primary Examiner* — David Q Nguyen
(74) *Attorney, Agent, or Firm* — Lewis Roca Rothgerber Christie LLP

(57) ABSTRACT

A method of providing multi-link operation channel access in a multi-link network includes initiating a first backoff countdown and a second backoff countdown associated with a first link and a second link of the multi-link network, respectively, and in response to the first backoff countdown reaching zero, determining whether the second backoff countdown is less than or equal to an aggregation threshold, and in response to determining that the second backoff countdown is less than or equal to the aggregation threshold, transmitting a first frame and a second frame on the first and second links.

9 Claims, 15 Drawing Sheets

Related U.S. Application Data provisional application No. 62/947,955, filed on Dec. 13, 2019, provisional application No. 62/933,039, filed on Nov. 8, 2019, provisional application No. 62/928,271, filed on Oct. 30, 2019, provisional application No. 62/900,162, filed on Sep. 13, 2019, provisional application No. 62/898,470, filed on Sep. 10, 2019.

(56) References Cited

U.S. PATENT DOCUMENTS

| | | | |
|---|---|---|---|
| 2016/0127098 A1* | 5/2016 | Ng | H04L 5/001 370/329 |
| 2017/0318607 A1* | 11/2017 | Tiirola | H04L 27/0006 |
| 2018/0206143 A1 | 7/2018 | Patil et al. | |
| 2018/0255576 A1* | 9/2018 | Bhorkar | H04L 5/0005 |
| 2018/0317170 A1* | 11/2018 | Cariou | H04W 72/0473 |
| 2019/0141744 A1 | 5/2019 | Naghshvar et al. | |
| 2020/0037288 A1 | 1/2020 | Huang et al. | |
| 2020/0107393 A1 | 4/2020 | Chu et al. | |

OTHER PUBLICATIONS

EPO Extended Search Report dated Dec. 11, 2020, issued in corresponding European Patent Application No. 20193034.4 (9 pages).

Multi-link Channel Access Discussion, Sep. 15, 2019, IEEE 802.11-19/1405r1, 18 pages.

Bellalta, B., IEEE 802.11ax: High-Efficiency WLANs, IEEE Wireless Communications, ResearchGate, Dec. 2015, 17 pages.

Considerations of New Queue Mechanism for Real-Time Application, IEEE 802.11-19/1175r0, Jul. 10, 2019, 9 pages.

Reducing Channel Access Delay for RTA Traffic, IEEE 802.11-19/1960r1, Nov. 12, 2019, 11 pages.

Multilink channel access considering STR capability, IEEE 802.11-20/0134r4, Mar. 30, 2020, 13 pages.

Multi-link Channel Access Discussion Follow-up, IEEE 802.11-19/1836r1, Nov. 11, 2019, 16 pages.

* cited by examiner

MULTI LINK TXOP AGGREGATION

CROSS-REFERENCE TO RELATED APPLICATION(S)

This application claims priority to, and the benefit of, U.S. Provisional Application No. 62/898,470 ("SYSTEM AND METHOD FOR PROVIDING MULTI-LINK OPERATION CHANNEL ACCESS"), filed on Sep. 10, 2019, the entire content of which is incorporated herein by reference.

This application also claims priority to, and the benefit of, U.S. Provisional Application No. 62/900,162 ("SYSTEM AND METHOD FOR PROVIDING MULTI-LINK OPERATION CHANNEL ACCESS"), filed on Sep. 13, 2019, the entire content of which is incorporated herein by reference.

This application also claims priority to, and the benefit of, U.S. Provisional Application No. 62/928,271 ("SYSTEM AND METHOD FOR PROVIDING MULTI-LINK OPERATION CHANNEL ACCESS"), filed on Oct. 30, 2019, the entire content of which is incorporated herein by reference.

This application also claims priority to, and the benefit of, U.S. Provisional Application No. 62/933,039 ("SYSTEM AND METHOD FOR PROVIDING MULTI-LINK OPERATION CHANNEL ACCESS"), filed on Nov. 8, 2019, the entire content of which is incorporated herein by reference.

This application also claims priority to, and the benefit of, U.S. Provisional Application No. 62/947,955 ("SYSTEM AND METHOD FOR PROVIDING MULTI-LINK OPERATION CHANNEL ACCESS"), filed on Dec. 13, 2019, the entire content of which is incorporated herein by reference.

This application also claims priority to, and the benefit of, U.S. Provisional Application No. 62/959,414 ("MULTI-LINK OPERATION DESIGN UNDER OPERATION CONSTRAINTS"), filed on Jan. 10, 2020, the entire content of which is incorporated herein by reference.

This application also claims priority to, and the benefit of, U.S. Provisional Application No. 62/989,386 ("MULTI-LINK MANAGEMENT-CONSTRAINT INDICATION AND OPERATING MODE"), filed on Mar. 13, 2020, the entire content of which is incorporated herein by reference.

This application also claims priority to, and the benefit of, U.S. Provisional Application No. 62/992,719 ("MLO Constraint Indication and Operating Mode"), filed on Mar. 20, 2020, the entire content of which is incorporated herein by reference.

This application also claims priority to, and the benefit of, U.S. Provisional Application No. 63/021,069, filed on May 6, 2020, the entire content of which is incorporated herein by reference.

FIELD

Aspects of the present disclosure relate to wireless network communication.

BACKGROUND

Generally, a basic service set (BSS) includes an access point (AP), such as a wireless router, and one or more stations, such as user devices (e.g., phones, laptops, TVs, etc.). The access point enables the stations within the BSS to connect to a wired network. In a multi-link BSS, such as a wi-fi network, an access point (AP) may operate over multiple links whose channels of operation are possibly located on different bands, although a subset of the channels might be on the same band. An example of the multi-channel BSS may be 20 MHz operation in the 2.4 GHz band, 80 MHz operation in the 5 GHz band, and 160 MHz operation in 6 GHz band, two or more of which may be performed concurrently. The access point may advertise its multi-link operation through beacons, probe responses, etc. The station may notify the access point of its capability or station type during the association phase.

The stations participating in a multi-link BSS may generally be classified as follows: 1) legacy stations, which are compatible with 802.11ax, 802.11ac, 802.11n, etc., and that associate with the access point on a single link operating through baseline mechanisms; 2) single link stations (SL STAs), such as, extremely-high-throughput stations (EHT STAs) that operate on a single link (e.g., for power saving when no active action running, for coexistence, etc.); and 3) Multi-link stations (ML STAs), which are extremely-high-throughput stations that associate with the access point on a multi-link operation. This classification may change over time, and the same station may be SL STA at time t0 and ML STA at time t1, depending on its mode of operation and the set of links it supports at times t0 and t1. In other words, the selection of links on which a station operates can be time-variant. Thus, it is desirable to design of mechanisms that enable such dynamic operation.

The above information disclosed in this Background section is only for enhancement of understanding of the background of the disclosure and therefore it may contain information that does not constitute prior art.

SUMMARY

Aspects of example embodiments of the present disclosure are directed to a system and a method for addressing some of the issues presented with the introduction of multi-link operation in the current amendment of the IEEE 802.11 standard.

Aspects of example embodiments of the present disclosure are directed to enhancing medium utilization of non-STR STA in asynchronous multi-channel operation. Further aspects of the present disclosure are directed to improving fairness in medium access to non-STR and legacy stations in a multi-link network, in particular, in view of transmit opportunity aggregation by multi-link stations.

According to some embodiments of the present disclosure, there is provided a method of providing multi-link operation channel access in a multi-link network, the method including: initiating a first backoff countdown and a second backoff countdown associated with a first link and a second link of the multi-link network, respectively; and in response to the first backoff countdown reaching zero, determining whether the second backoff countdown is less than or equal to an aggregation threshold; and in response to determining that the second backoff countdown is less than or equal to the aggregation threshold, transmitting a first frame and a second frame on the first and second links.

In some embodiments, the method further includes: determining that the first and second links are idle.

In some embodiments, the method further includes: maintaining a contention window of the second link the same as that prior to transmitting the second frame.

In some embodiments, the method further includes, in response to the determining that the second backoff countdown is less than or equal to the aggregation threshold: suspending the second backoff countdown prior to transmitting the second frame; and resuming the second backoff countdown after completion of transmission on the second link.

In some embodiments, the method further includes, in response to the determining that the second backoff countdown is less than or equal to the aggregation threshold: suspending the second backoff countdown prior to transmitting the second frame; and generating a new start value for the second backoff countdown, wherein the new start value is a random value less than a contention window of the second link.

In some embodiments, the first and second frames have time-aligned start and end times.

In some embodiments, the method further includes: padding a shorter one of the first and second frames to equalize frame durations of the first and second frames.

In some embodiments, the method further includes: in response to determining that the second backoff countdown is greater than the aggregation threshold, transmitting a first frame on the first link and not transmitting on the second link.

In some embodiments, the method further includes: receiving the aggregated threshold from an access point of the multi-link network.

In some embodiments, at least one of the first and second frames includes an encapsulation of a physical header, one or more MAC headers, and one or more data payloads.

According to some embodiments of the present disclosure, there is provided a method of providing multi-link operation channel access in a multi-link network, the method including: initiating a first backoff countdown and a second backoff countdown associated with a first link and a second link of the multi-link network, respectively; and in response to the first backoff countdown reaching zero, identifying the second link as either a restricted link or an unrestricted link; in response to identifying the second link as the unrestricted link, transmitting a first frame and a second frame on the first and second links, respectively; and in response to identifying the second link as the restricted link, transmitting a first frame on the first link and not transmitting on the second link.

In some embodiments, the transmitting the first frame and the second frame includes: simultaneously transmitting the first and second frames on the first and second links.

In some embodiments, the method further includes: determining that the second link is idle prior to the transmitting the second frame.

According to some embodiments of the present disclosure, there is provided a method of providing multi-link operation channel access in a multi-link network, the method including: initiating a first backoff countdown and a second backoff countdown associated with a first link and a second link of the multi-link network, respectively; and in response to the first backoff countdown reaching zero, determining whether the second backoff countdown is less than or equal to an aggregation threshold; and in response to determining that the second backoff countdown is less than or equal to the aggregation threshold, transmitting requests-to-send frames on the first link and the second link; and in response to receiving clear-to-send frames on both of the first and second links, transmitting a first frame and a second frame on the first and second links.

In some embodiments, the method further includes: monitoring the first and second links for the clear-to-send frames from an access point of the multi-link network.

In some embodiments, the method further includes, in response to receiving a clear-to-send frame on the first link and not on the second link: transmitting the first frame on the first link and not transmitting on the second link.

In some embodiments, the method further includes, in response to not receiving a clear-to-send frame on any of the first and second links: restricting transmission on the first and second links.

In some embodiments, the method further includes: maintaining a contention window of the second link the same as that prior to transmitting the second frame.

In some embodiments, at least one of the first and second frames includes an encapsulation of a physical header, one or more mac headers, and one or more data payloads.

In some embodiments, the method further includes, in response to the first backoff countdown reaching zero: identifying a status of the second link as idle.

BRIEF DESCRIPTION OF THE DRAWINGS

These and other features of some example embodiments of the present disclosure will be appreciated and understood with reference to the specification, claims, and appended drawings, wherein:

DETAILED DESCRIPTION

The detailed description set forth below in connection with the appended drawings is intended as a description of some example embodiments of a system and a method for channel estimation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
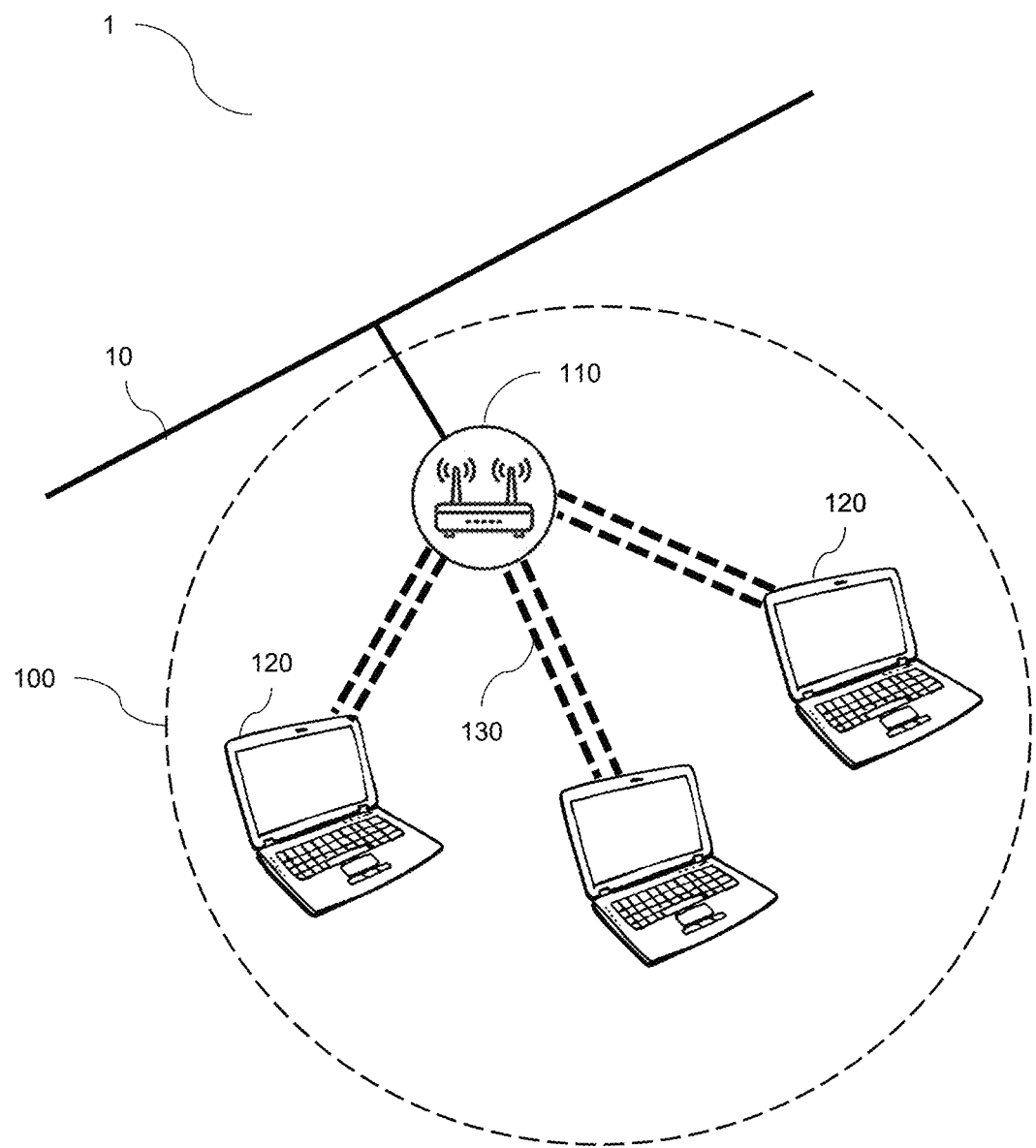
FIG. 1 is a block diagram of a communication network, according to some embodiments of the present disclosure.

FIG. 1 is a block diagram of a communication network 100, according to some embodiments of the present disclosure.

According to some embodiments, the communication network 100 (e.g., a wireless network), which may be a basic service set (BSS), includes an access point (AP) 110 and one or more stations (STAs) 120. The access point 110 is a wireless network device that is connected to a wired network 10 and acts as a portal for the stations within the BSS 100. Thus, the access point may transform a wired signal to a wireless one, and vice versa. The access point 110 may include a router, or may be coupled to the wired network 10 through a router. Each station 120 within the BSS 100 may be a wireless end-device (e.g., a client device), such as a mobile phone, a tablet, a computer, a television, a wireless sensor, etc.

In some examples, the access point 110 is a many-antenna system and may communicate with each station 120 within the BSS 100 through two or more channels/links 130. The access point 110 may establish the channels of operation 130 for the stations within the BSS 100. As such, the access point may select the channels of operation 130 such that the access point 110 has simultaneous transmit-receive (STR) capability on every pair of links in its BSS. As used herein, STR capability refers to the ability to support reception on one link 130 while transmitting on another link 130 (e.g., concurrent reception and transmission on two links). STR capability of a device (e.g., an access point 110 or a station 120) may depend on a number of factors such as RF design and operation parameters including channel location, bandwidth of each channel, antenna distribution, etc. Throughout this disclosure, the terms "link", "channel", and medium are used interchangeably to refer to a frequency band that is used by the wireless network 100 to send and receive data.

To realize the full potential of multi-channel operation, it is desirable for participating stations/devices 110/120 to have simultaneous bi-directional communication capability on the multiple channels 130. With such capability, uplink and downlink communications can occur simultaneously between the access point 110 and a station 120 in an asynchronous manner. However, even a station 130 that is a multi-radio device may lack such capability due to in-device power leakage caused by insufficient frequency separation of the operating.

According to some examples, the constraints on multi-link operation may include STR constraints, simultaneous transmit-transmit (STT) constraints, and simultaneous receive-receive (SRR) constraints. When the operation is STR constrained, the station 130 may not be able to detect the physical preamble/header (e.g., an 802.11 PHY preamble) of a frame or decode a physical header on a link A when transmitting on link B. This may occur, for example, when link A is operating in the lower 5 GHz band and the link B is operating in the upper 5 GHz band. When the operation is STT constrained, a multi-link station (a ML STA) 120 may not be capable of simultaneous transmission on a certain combination of channels/links 130 due to issues with intermodulation. In addition, for some channel combinations, a multi-link station 120 may not be capable of simultaneous transmission on those channels with a single antenna due to RF limitations. Further, when the operation is SRR constrained, a multi-link station 120 may not be capable of simultaneous reception on some channels 130 with a single antenna due to RF limitations. In such cases, a station 120 may not maintain network allocation vector (NAV) on the links 130 as it may not be able to detect/decode packets simultaneously on the links 130. Therefore, a multi-link station 120 with SRR constraint on a pair of links 130 may fall back to single link operation. In IEEE 802.11, the NAV may represent the amount of time that the transmitting station intends to hold the medium busy.

Based on these multi-link operation constraints, a station 120 may be classified as a simultaneous transmit-receive station (STR STA), which may be capable of STR, STT, and SRR on a link pair; a non-simultaneous transmit-receive station (non-STR STA), which may not be capable of STR, but may be capable of STT and SRR on a link pair; a non-simultaneous transmit-transmit station (non-STT STA), which may not be capable of STR or STT, but may be capable of SRR on that link pair; and a single-link station (SL STA), which operates on only one link of a link pair. An SL STA may include legacy stations as well as extremely-high-throughput stations operating on a single link due to SRR constraints, being in a power-save mode, etc. A single device 110/120 may be STR capable on one pair of links, and be non-STR on a different pair of links.

According to some examples, each frame (or data frame) may be a physical protocol data unit (PPDU) which includes (e.g., encapsulates) a physical (PHY) preamble/header (e.g., PHY layer header) and one or more media access control (MAC) protocol data units (MPDUs). Each MPDU may include a MAC header (e.g., a MAC layer header) and a data payload.

Figure 2A:
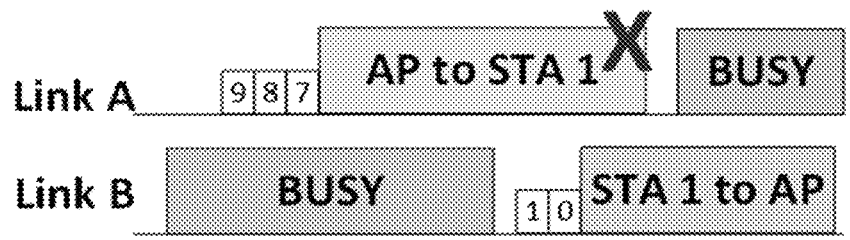
FIGS. 2A-2C illustrate the collisions that may occur in an asynchronous multi-link operation with non-STR stations in which the medium access on each channel is completely independent.
Figure 2B:
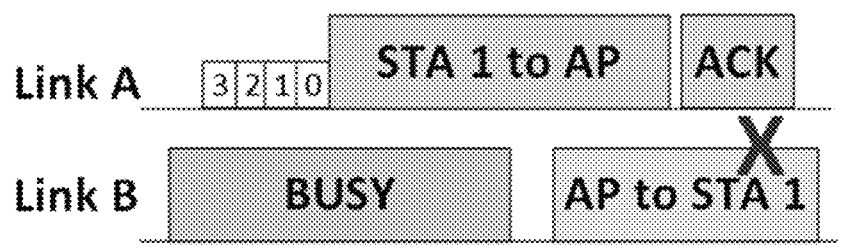
Figure 2C:
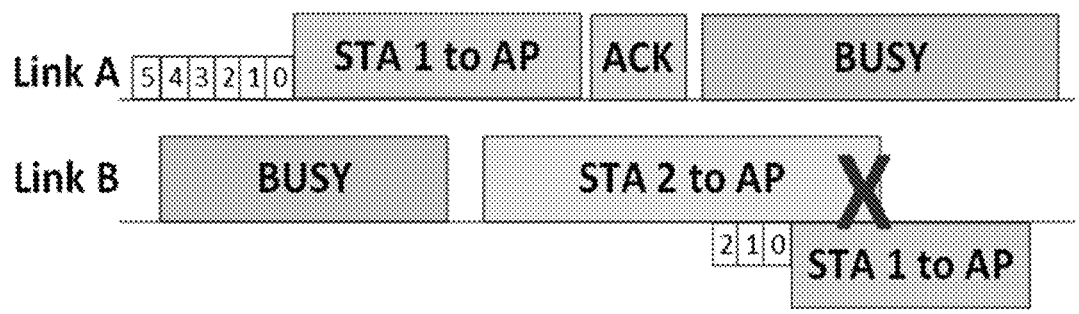

FIGS. 2A-2C illustrate the collisions that may occur in an asynchronous multi-link operation with non-STR STAs in which the medium access on each channel is completely independent. FIG. 2A illustrates a collision due to non-STR STA transmission, FIG. 2B illustrates collision due to access point's transmission, and FIG. 2C illustrates a collision due to non-STR STA's packet detection failure. The STR collisions illustrated in FIGS. 2A-2C, show timelines from the perspective of a non-STR STA denoted by STA 1.

FIG. 2A illustrates a scenario where the non-STR STA contends on channel B after it becomes idle and transmits after winning contention. On channel A, the access point is transmitting to the non-STR STA which the non-STR STA fails to receive successfully due to its own transmission on channel B.

FIG. 2B illustrates the scenario where the access point contends on link B after it becomes idle and transmits after winning contention. On link A, non-STR STA is transmitting to the AP. Therefore, non-STR STA fails to receive AP's transmission on link B.

FIG. 2C illustrates the scenario where a non-STR STA completes transmission on link A and resumes contention on both links. Right after the non-STR STA completes transmission on link A, the non-STR STA may fail to detect an ongoing intra-BSS transmission (i.e., a transmission from another station (STA 2) within the same BSS) on link B. This detection failure may occur because of following reasons: (a) the non-STR STA failed to receive the physical header (of e.g., the frame from a second station to the access point) on link B as the non-STR STA was transmitting on link A at that time, or (b) the received energy by the non-STR STA of the ongoing transmission on link B is below the energy detection threshold defined in the 802.11 standard. This ongoing transmission on link B might be an uplink transmission (e.g., a frame being sent to the access point) or a downlink transmission (e.g., a frame being sent from the access point). If the non-STR STA proceeds to attempt medium access on link B and transmits, there will be a collision in the BSS either at (a) the access point in case the ongoing transmission is an uplink frame or (b) another station (STA 2) within the BSS if the ongoing transmission is a downlink frame intended for (e.g., destined to) that station. In either case, the transmission failure may lead to an increase in the size of the backoff window of the transmitter following the IEEE 802.11 standard backoff procedure, which reduces throughput utilization and overall system performance.

According to some examples, the STR collisions of FIGS. 2A-2C may be addressed by suspending transmission attempts on a channel (e.g., link A) from a non-STR STA to the access point and from the access point to the non-STR STA when either the non-STR STA or the access point is in a busy state on another channel (e.g., link B). For example, at the non-STR STA, to address the scenario illustrated in FIG. 2A, the backoff procedure (e.g., the 802.11 backoff procedure) for medium access may be suspended on one channel (e.g., channel B) whenever the station is in a transmit or receive state or in on another channel (e.g., on channel A). Further, to prevent the scenario illustrated in FIG. 2B, the access point may not attempt transmission to any non-STR STA on one channel/link (e.g., channel B) when it is receiving intra-BSS frame on another channel/link (e.g., channel A) as this intra-BSS frame may be from a non-STR STA.

Figure 3:
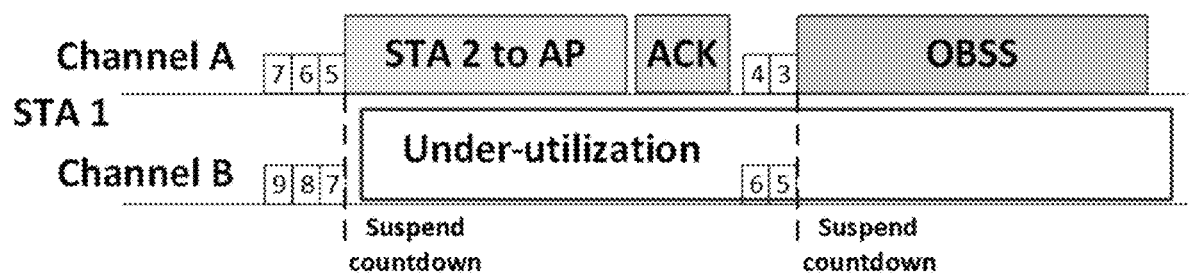
FIG. 3 illustrates the multi-link operation using the above baseline strategy, according to some embodiments of the present disclosure.

FIG. 3 illustrates the multi-link operation using the above baseline strategy, according to some embodiments of the present disclosure. In FIG. 3, the non-STR STA (i.e., STA 1) suspends its backoff procedure on link B when it is in a receive state on link A. Here, the backoff suspension is indicated by the backoff countdown (e.g., 9, 8, 7) being suspended when an uplink transmission in the same BSS (e.g., indicated by the frame from STA 2 to the access point), and again being suspended when there is a transmission in a neighboring BSS (e.g., the frame from the Overlapping BSS (OBSS)) that appears on link A. However, these suspensions may be unnecessary because, in both the cases, even if the non-STR STA had resumed its contention on link B and transmitted, there would be no STR collision as the transmissions on link A are not intended for (e.g., designated for) the non-STR STA. This may result in medium underutilization, and therefore, it may be desirable to improve the medium utilization of non-STR STAs beyond this baseline strategy.

According to some embodiments, the non-STR STA medium utilization is improved by utilizing opportunistic backoff recommencement.

Generally, for a station, decoding the MAC header of a frame on a link to identify the frame's designated receiver (as, e.g., the station itself or another station within the BSS) can take some time (e.g., more than 100 μS). However, reading a physical header of a frame may take significantly less time (e.g., in the order of 20 μS to 50 μS). Accordingly, in some embodiments, the physical header of a frame transmitted on a link (e.g., link A) by an access point includes information indicating whether transmission on another link (e.g., link B in FIG. 3) would lead to STR collision or not. The station observing this transmission on the link can quickly interpret this information in the physical header and determine whether to resume medium access (e.g., resume the backoff countdown) or not.

Figure 4:
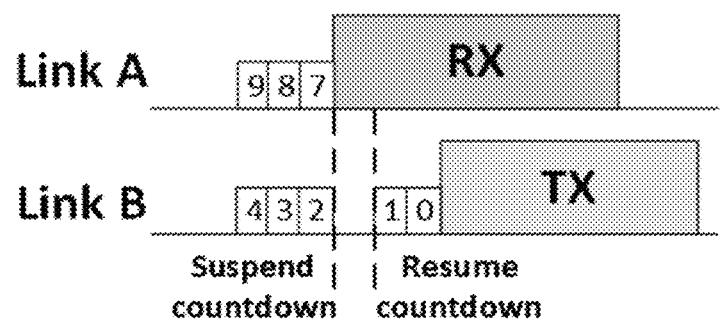
FIG. 4 illustrates the effect of opportunistic backoff recommencement in improving medium access utilization, according to some embodiments of the present disclosure.

FIG. 4 illustrates the effect of opportunistic backoff recommencement in improving medium access utilization, according to some embodiments of the present disclosure.

In the example of FIG. 4, a non-STR STA is contending for access on both link A and link B. This is indicated by the independent countdown timers on the two links (i.e., "9, 8, 7" on link A and "4, 3, 1, . . . " on link B). However, the non-STR STA receives a frame on link A and suspends countdowns on both links A and B to avoid any collisions. The non-STR STA reads the physical header of the frame received through link A and determines that the frame is not intended/designated for the non-STR STA and the physical header does not identify any transmission on link B. Thus, the non-STR STA resume the countdown on link B (as indicated by "1, 0") after a short time (e.g., about 20 μS to 50 μS). Once the countdown of link B reaches zero, the non-STR STA transmits on link B. Therefore, according to some embodiments, opportunistic backoff recommencement allows the non-STR STA to improve (e.g., maximize) access utilization, while avoiding collisions.

At the non-STR STA, the key STR collision scenario to avoid is the non-STR STA resuming backoff countdown on link B when the frame being received on link A is a downlink frame intended to this non-STR STA (see, e.g., FIG. 2A). In other cases, the backoff countdown on link B can be resumed as illustrated in FIG. 4. Thus, according to some embodiments, after suspending backoff countdown due to a frame appearing on a link (e.g., channel A), the non-STR STA resumes backoff on another link (e.g., channel B) when receiving a frame on channel A that is either a neighbor BSS frame, an intra-BSS uplink frame (i.e., a frame intended for the access point of the BSS), or an intra-BSS downlink intended to another station. A neighbor BSS frame may be a frame from another close-by wireless network that has sufficiently high energy to be detected by the non-STR STA as a frame of data.

According to the 802.11ax protocol, the physical header of a frame has a BSS color indicator to identify which BSS the frame is from. This BSS color indicator may be a 6-bit identifier that is attached to the physical header of each frame and allows the non-STR STA to determine whether the frame on a link is an intra-BSS or from a neighboring BSS. In some examples, the access point can identify, based on the BSS color indicator, which frames are from other networks and ignore them to improve spatial reuse with intra-BSS signals. Further, the 802.11ax physical header also includes an uplink/downlink bit to indicate if a frame (e.g., an intra-BSS frame) is an uplink or downlink frame. Additionally, according to some embodiments, the physical header of at least all downlink frames (e.g., all downlink single-user transmissions from the access point) includes a station identifier information that allows the non-STR STA to identify whether a frame is intended for the non-STR STA or another station. In some examples, the station identifier may be small and have 48 bits or less. In some embodiments, the station identifier in the physical header is different from (e.g., shorter than) a station address of a MAC header. For example, the station identifier in the physical header in the physical header may be 12 bits long, while the MAC address may be 48 bits long. Two different networks (BSSs) may use same station identifier to identify two different devices; however, the station identifier and the BSS color can together uniquely identify a particular station. Thus, according to some embodiments, by reading the BSS color indicator, the uplink/downlink bit, and the station identifier of the physical header of a frame, the non-STR STA can determine whether the frame on a link is a neighbor BSS frame, an intra-BSS uplink frame, or an intra-BSS downlink intended for another station, and so determine whether to resume backoff countdown or not. In some embodiments, both of the station and the access point are capable of encoding the station identifier in the physical header.

In some embodiments, decoding the physical header is significantly faster than decoding the MAC header (e.g., 40 µS v. 150 µS or several milliseconds). Therefore, making contention decisions based on information coded in the physical header, as opposed to the MAC header information, can substantially improve medium access efficiency and increase the non-STR STA's medium utilization. To further reduce decoding time, in some embodiments, the non-STR STA does not decode the station identifier in the physical header when it identifies a frame as an inter-network frame or an intra-network uplink frame.

At the access point, a key STR collision scenario to avoid is the access point attempting to transmit to a non-STR STA on a link when receiving frame from the non-STR STA on another link (see, e.g., FIG. 2B). As noted above, in some embodiments, the access point has STR capability and multi-link stations indicate their STR capability to the access point (e.g., during the association phase). This knowledge may be utilized by the access point to improve medium utilization.

According to some embodiments, the physical header of a frame generated by a station (i.e., an uplink frame) includes the station identifier. Therefore, in some embodiments, when an access point determines that a frame being received on one link is from a particular non-STR STA, the access point does not transmit to that STA upon gaining medium access on another link. In this manner, the access point can transmit to a non-STR STA on one link (e.g., link A) while receiving from another non-STR STA on another link (e.g., link B).

In the case of 802.11 frames with legacy physical headers (i.e., physical headers that do not include a BSS color indicator, an uplink/downlink bit, and the station identifier), which is common in control/management frames and transmissions of legacy devices, the information utilized by the non-STR STA, according to some embodiments, to resume backoff countdown at the earliest time is unavailable. Thus, according to some embodiments, when the non-STR STA and access point determine that the physical header does not include a BSS color indicator, an uplink/downlink bit, or a station identifier, the non-STR STA and the access point wait to decode the 802.11 MAC header information to determine the receiver of the frame. After doing so, the access point and the non-STR STA follow the methods described above. Decoding the 802.11 MAC header may take longer than decoding the physical header (e.g., longer by 3 times or more), which can reduce medium utilization; however, avoiding collision by adopting this approach may improve medium access efficiency over the solutions of the related art.

In some examples, the non-STR STA may negotiate with the access point the physical protocol data unit (PPDU) formats for individually addressed frames and group addressed frames intended for (e.g., destined to) the non-STR STA. Accordingly, backoff can recommence if a detected frame does not belong to the negotiated formats. For example, the non-STR STA may negotiate with the access point only extremely high throughput (EHT) and non-high-throughput (non-HT) formats. Accordingly, the non-STR STA may recommence backoff countdown when the frame's PPDU type is not one of EHT or non-HT format. For example, it may be one of high throughput (HT), very high throughput (VHT) or High Efficiency (HE) formats.

Figure 5:
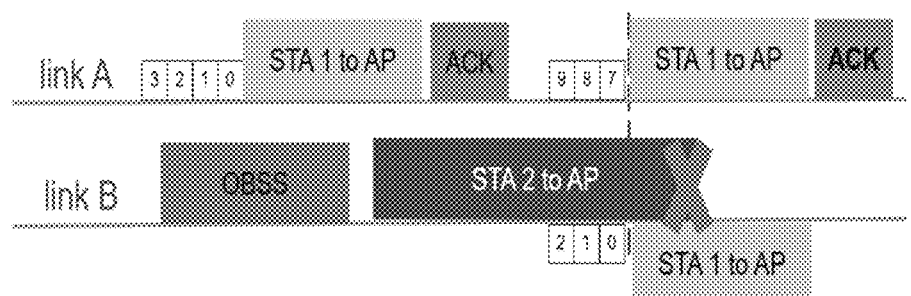
FIG. 5 illustrates a collision at the access point that may occur as a result of concurrent transmission by both a non-STR STA and a single-link station on different channels, according to some examples.

FIG. 5 illustrates a collision at the access point that may occur as a result of concurrent transmission by both a non-STR STA and a single-link station (SL STA) on different channels, according to some examples.

In the example of FIG. 5, the non-STR STA (STA 1) is transmitting on link A during which a single-link station (STA 2), which is only capable of receiving and transmitting on a single link, begins transmission on link B. The non-STR STA is unable to receive/sense the transmission on link B and may find the link B to be idle due to low received power from single link STA (hidden terminal). RTS-CTS (Request to send/Clear to send: helps to reduce frame collision in 802.11 protocol) does not solve this problem. Since the non-STR STA was busy transmitting on link A single-link when the single-link station began transmitting on link B, the non-STR STA would not have received the clear-to-send (CTS) broadcast from the access point on link B, and would be unaware of the transmission on link B. In this scenario, if the non-STR STA gains access to link B and transmits, it can lead to a collision at the access point causing reception failure of the single-link station's transmission and also the non-STR STA's transmission.

This collision may be addressed by utilizing the access point's knowledge of the non-STR STA having the STR constraint, since this constraint was indicated by the non-STR STA when it began operation on this link pair. In some embodiments, the collision is addressed through one or more of a suspension countdown timer at the non-STR STA, energy detection at the non-STR STA, and the broadcast of remaining TXOP by the access point.

According to some embodiments, the access point indicates in its feedback (e.g. the acknowledgment (ACK or Block Ack) shown in FIG. 5) to the non-STR STA that the access point is receiving an intra-BSS frame on another link (e.g., the frame from STA2 to AP on link B in FIG. 5). In some embodiments, upon receiving this indication, the non-STR STA can suspend its backoff countdown on the other link (e.g., link B) and begin a suspension countdown timer (which may be similar to the multi-user enhanced distributed channel access (MU EDCA) timer in the 2019 802.11ax standard draft). In some examples, the suspension countdown may be up to 5.43 mS. Once the suspension countdown reaches zero, the non-STR STA returns to normal operation by resuming the backdown countdown on the link (e.g., link B). During the suspension countdown on a link, if the non-STR STA receives an intra-BSS frame, it stops the suspension countdown timer and resumes the backoff procedure. Using the suspension countdown timer ensures that the non-STR STA does not suspend backoff countdown for a long time in case the channel becomes idle with no other intra-BSS frame transmission. The suspension countdown value can be advertised by the access point in the same frame (e.g., beacon) in which it advertises the multi-link channel access mode information or a default value of 5.43 mS may be used, which may be the duration of the longest PPDU. The access point may broadcast the beacon to the stations within the BSS at startup and at regular intervals (e.g., every 100 mS).

As an alternative to using a suspension countdown timer or in addition thereto, in some embodiments, the non-STR STA utilizes a suspension-mode energy detection threshold to determine whether it can transmit on link B when it has just finished transmitting on link A. According to some embodiments, the new energy detection threshold is used in this particular scenario to enable the non-STR STA to detect transmission from other stations on link B is different from (e.g., greater than) the frame detection threshold used in normal operation. For example, the suspension-mode energy detection threshold may be about −72 dBm to about −82 dBm, which is lower than the energy detection threshold during normal operation (e.g., −62 dBm). When the detected energy is greater than or equal to this threshold, the non-STR STA determines that there is transmission on link B (i.e., link B is busy), and the non-STR STA does not attempt any transmission on this link. However, according to some embodiments, when the detected energy is less than the threshold, the non-STR STA may initiate backoff countdown on link B even if the suspension countdown timer has not reached zero. Using this frame detection scheme while in suspension countdown allows the non-STR STA to resume transmission on link B without having to wait for the entire duration of the suspension countdown, which may further improve medium access efficiency.

According to some embodiments, in addition to the busy state indication through the acknowledgement (ACK or Block Ack), the access point additionally provides the remaining transmit opportunity (TXOP) on the other link. The TXOP defines the time duration for which a station can send frames after it has gained contention for the transmission medium. Accordingly, non-STR STA may precisely determine how much time to suspend the backoff countdown.

Using the suspension countdown timer, the broadcasting of remaining TXOP, and/or the lower energy detection mechanisms described above may enhance the medium utilization of non-STR STAs in asynchronous multi-channel operation.

Figure 6:
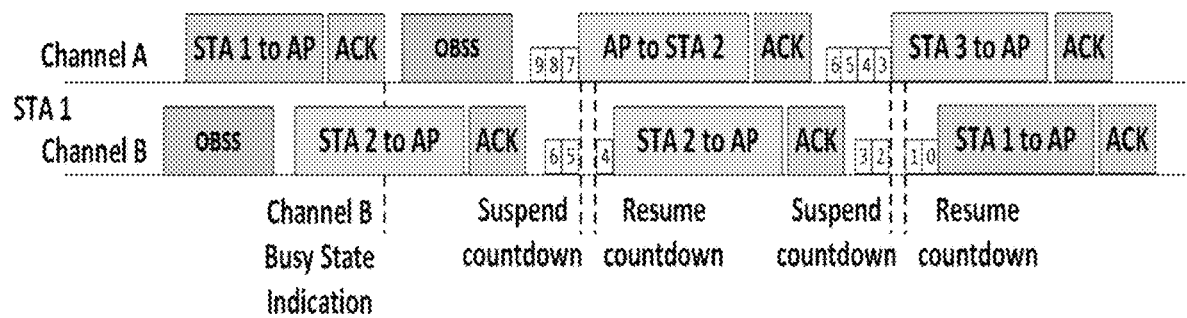
FIG. 6 illustrates the effect of opportunistic backoff recommencement and the multi-link busy status indication in avoiding collisions and improving medium access utilization in a network with a non-STR STA, an STR STA, and a SL STA, according to some embodiments of the present disclosure.

FIG. 6 illustrates the effect of opportunistic backoff recommencement and the multi-link busy status indication in avoiding collisions and improving medium access utilization in a network with a non-STR STA, an STR STA, and a SL STA, according to some embodiments of the present disclosure. In FIG. 6, the first station STA 1 is a non-STR STA, the second station STA 2 is a STR STA, and the third station STA3 is a SL STA. The example shown in FIG. 6 is from the perspective of the non-STR STA.

According to some embodiments, after the transmission from the non-STR STA to the access point on link A, the access point provides a multi-channel busy status feedback in the corresponding acknowledgment (ACK or Block Ack) indicating an ongoing reception (of a frame from the second station STA 2) by the access point on link B. As a result of the busy status indication, in some embodiments, the non-STR STA defers from contending for medium access on channel B until synchronizing its contention state with an intra-BSS frame on link B. In this case, this intra-BSS frame is the acknowledgment from the access point for the second station's STA 2 transmission to the access point on link B.

After both links A and B become idle, the non-STR STA contends for medium access on both of the channels A and B (as indicated by the backoff countdown "9, 8, 7" on link A and "6, 5" on link B) and starts receiving a frame on link A, which is the access point's transmission to the second station STA 2. In some embodiments, upon detecting this frame on link A, the non-STR STA suspends/pauses the countdown on link B, and reads the physical header of the frame. Upon identifying that the frame is an intra-BSS downlink frame intended for to another station (e.g., based on the BSS color indicator, the uplink/downlink bit, and the station identifier in the physical header), the non-STR STA resumes backoff countdown on link B.

In the example of FIG. 6, similar to the access point, the second station STA 2 has STR capability and can therefore perform simultaneous transmission and reception. In the example of FIG. 6, the second station STA 2 wins the contention on link B and transmits to the access point. The non-STR STA senses (e.g., identifies) the transmission from the second station STA 2 (e.g., by decoding the physical header) and does not transmit on link B.

Next, the non-STR STA again begins backoff countdown on both links after respective links become idle. Then, the non-STR STA detects a frame it started receiving on link A (i.e., the third station's STA 3 transmission to the access point) and suspends backoff countdown in link B. The non-STR STA reads the physical header of the detected frame on link A and identifies the frame as an intra-BSS uplink frame. Accordingly, the non-STR STA resumes the backoff countdown on link B, and after the backoff countdown reaches zero, the non-STR STA transmits on link B.

Accordingly, the non-STR STA avoids any collisions on channels A and B, while also improving (e.g., increasing) its medium utilization.

Figure 7:
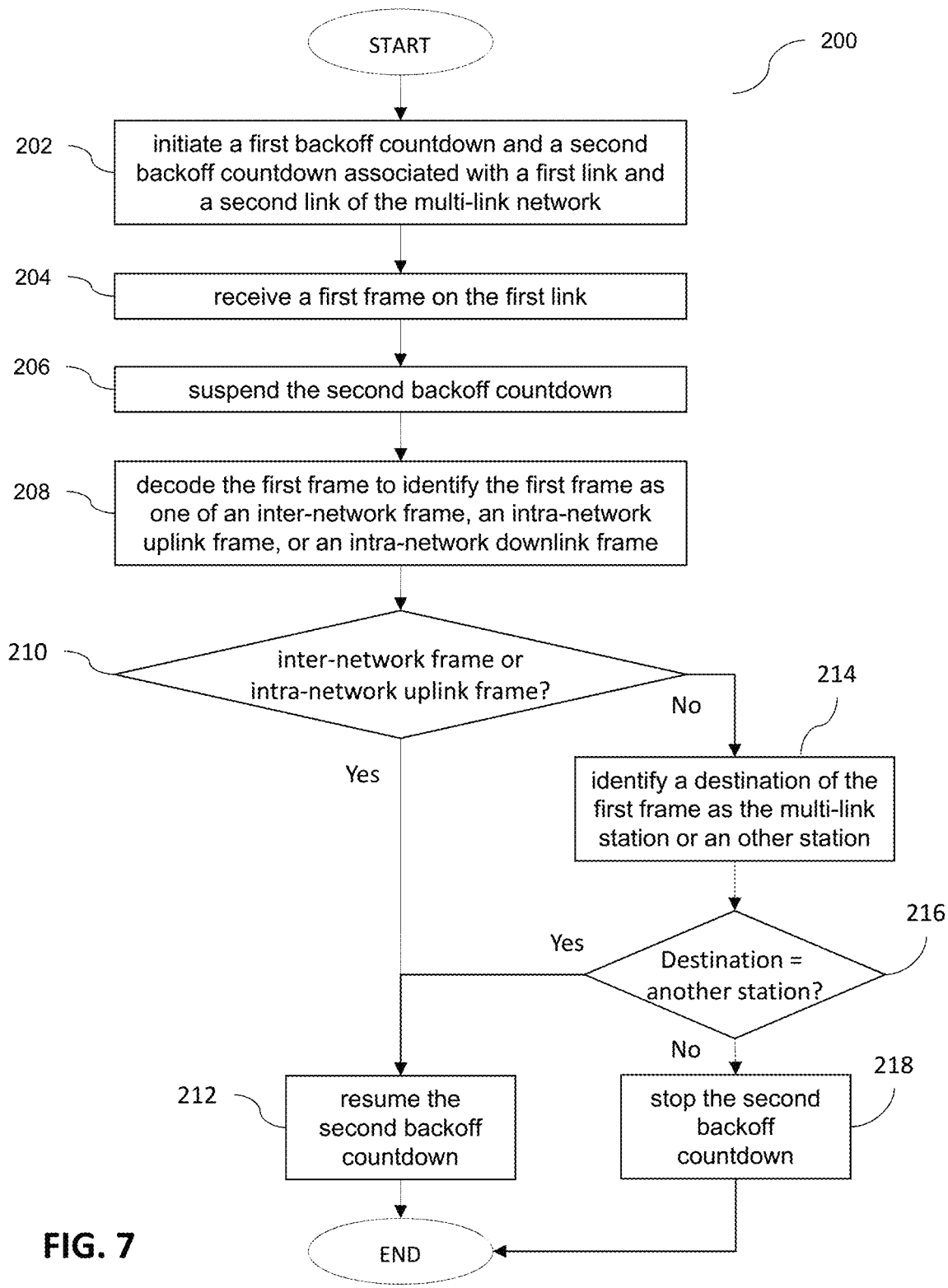
FIG. 7 is a flow diagram illustrating the process of providing multi-link operation channel access in a multi-link network, according to some embodiments of the present disclosure.

FIG. 7 is a flow diagram illustrating the process 200 of providing multi-link operation channel access in a multi-link network, according to some embodiments of the present disclosure.

In some embodiments, the multi-link station (e.g., a non-STR STA) initiates a first backoff countdown and a second backoff countdown associated with a first link and a second link of the multi-link network, respectively (202). The multi-link station receives a first frame on the first link (204), and thus suspends the second backoff countdown (206). The multi-link station decodes the first frame (e.g., decodes the physical header of the first frame) to identify the first frame as one of an inter-network frame, an intra-network uplink frame, or an intra-network downlink frame (208). In response to identifying the first frame as the inter-network frame or the intra-network uplink frame (210), the multi-link station resumes the second backoff countdown (212). When the first frame is an intra-network downlink frame, the multi-link device identifies the receiver of the first frame as the multi-link station or another station (214). When the designated receiver of the first frame is another station, the multi-link station resumes the second backoff countdown (212). However, when the designated receiver is the multi-link station itself, the multi-link station stops/suspends the second backoff countdown on the second link.

Figure 8:
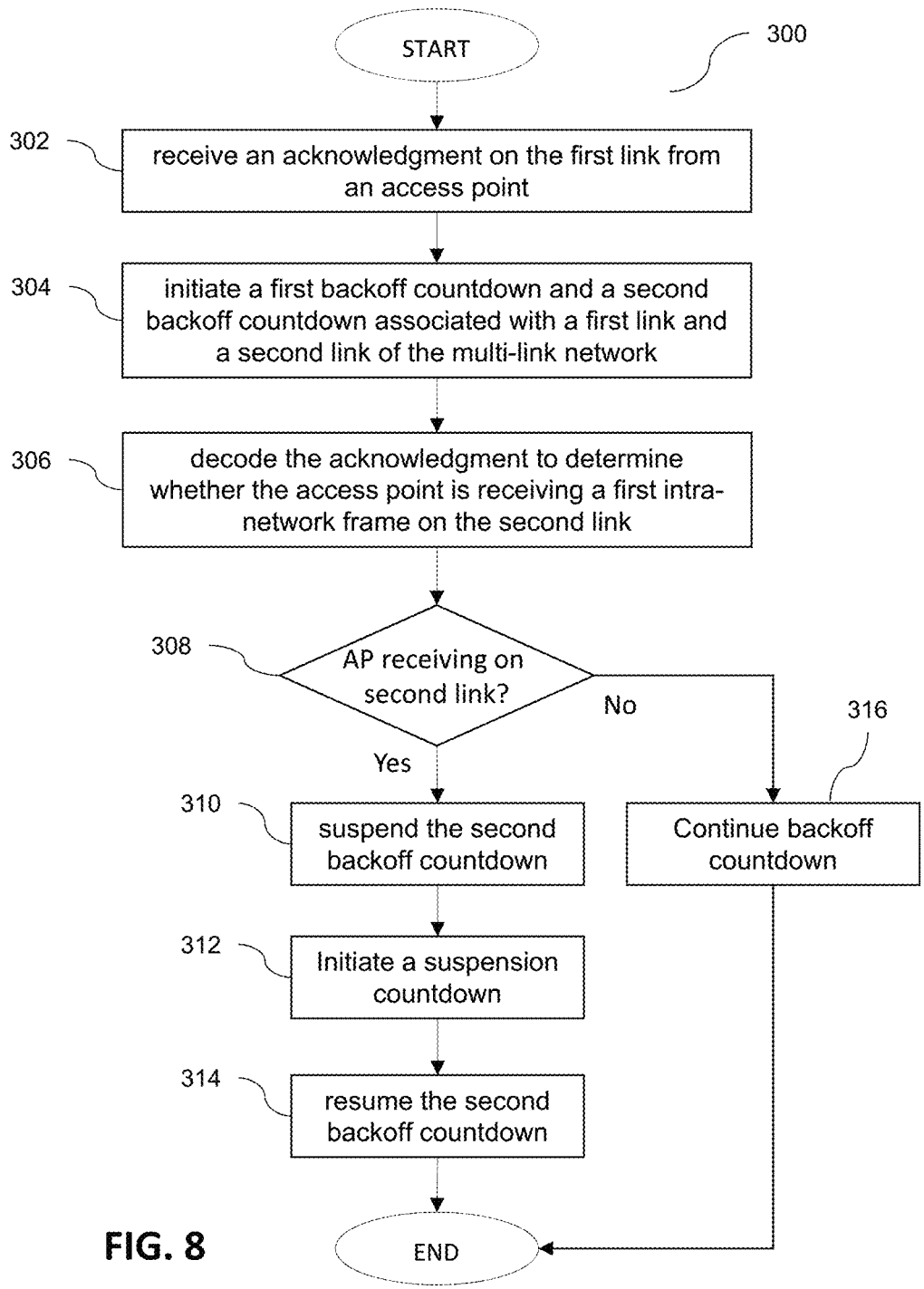
FIG. 8 is a flow diagram illustrating the process of providing multi-link operation channel access by utilizing access point acknowledgement in a multi-link network, according to some embodiments of the present disclosure.

FIG. 8 is a flow diagram illustrating the process 300 of providing multi-link operation channel access by utilizing access point acknowledgement in a multi-link network, according to some embodiments of the present disclosure.

In some embodiments, the multi-link station (e.g., a non-STR STA) receives an acknowledgment (ACK of Block Ack) from the access point on the first link as a result of completing a transmission to the access point on the first link (302). The multi-link station initiates a first backoff countdown and a second backoff countdown associated with a first link and a second link of the multi-link network, respectively (304). The multi-link station decodes the acknowledgment (304) to determine whether the access point is receiving a first intra-network frame on the second link or not (306). When the acknowledgment indicates that the access point is receiving on the second link (308), the multi-link station suspends the second backoff countdown (310) and initiates a suspension countdown (312). The multi-link station resumes the backoff countdown when the suspension countdown reaches zero (314). If the acknowledgment indicates that the access point is not receiving on the second link (308), the multi-link station continues the second backoff countdown and normal backoff procedure.

TXOP Aggregation

Transmit opportunity (TXOP) aggregation is a mechanism by which a multi-link station may synchronize (align in time) its transmissions on a pair of links that are idle (i.e., not busy). In some embodiments, when two or more channels are idle, the multi-link station commences transmission on the two or more channels simultaneously, as soon as the first of the corresponding two or more backoff countdowns reaches zero. Henceforth, the earliest link for which the backoff countdown reaches zero is referred to as the primary link, and the link that participates in multi-link aggregation without its backoff countdown having reached zero is referred to as the aggregated link.

Figure 9:
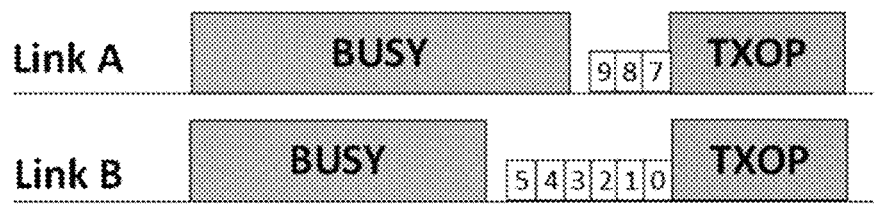
FIG. 9 illustrates transmit opportunity (TXOP) aggregation being performed on a pair of idle links, according to some examples of the present disclosure.

FIG. 9 illustrates TXOP aggregation being performed on a pair of idle links, according to some examples of the present disclosure. FIG. 9 is illustrated from the perspective of a multi-link station, and TXOP indicates the transmission by the multi-link station and BUSY indicates other traffic on a link.

In the example of FIG. 9, the multi-link station contends for access on both links A and B once the two channels become idle. Here, the backoff countdown for link B reaches zero before the backoff countdown of link A, and the multi-link station commences transmission on link B. In the related art, transmission on link A would not comment until after the corresponding backoff countdown reaches zero. However, according to some embodiments, the multi-link station commences transmission on both idle channels (i.e., even link A) as soon as the countdown on one channel (i.e., link B) reaches zero. In the example of FIG. 9, link B is the primary link and the link A is the aggregated link. In some embodiments, the frames (e.g., the PPDU) on the primary link and aggregated link(s) have aligned start and end times.

While TXOP aggregation may boost channel/medium access for the aggregating multi-link station, it may reduce channel access for single-link stations (e.g., legacy stations) contending on the same channels as the multi-link station. In the example of FIG. 9, a single-link station vying for access to link A, may lose out because of the early aggregated transmission on link A by the multi-link station. Thus, some embodiments of the present disclosure provide mechanisms for addressing fairness for single link and legacy stations in a multi-link BSS with aggregation mode enabled.

Generally, the links of a multi-link BSS operate independently and thus the network busy state may be independent across the links. It may be possible, that at a given time, the aggregated link may be busy with a higher mean backoff countdown value than the primary link.

According to some embodiments, the multi-link station utilizes the aggregated link for transmission only if its backoff countdown is less than or equal to a pre-defined aggregation threshold. This threshold may be set by the access point and be advertised through regularly broadcast beacons (similar to the 802.11ax MU EDCA). In some examples, the access point may dynamically set the aggregation threshold for each link based on the number of single-link stations associated on that link to maintain fairness.

Figure 10:
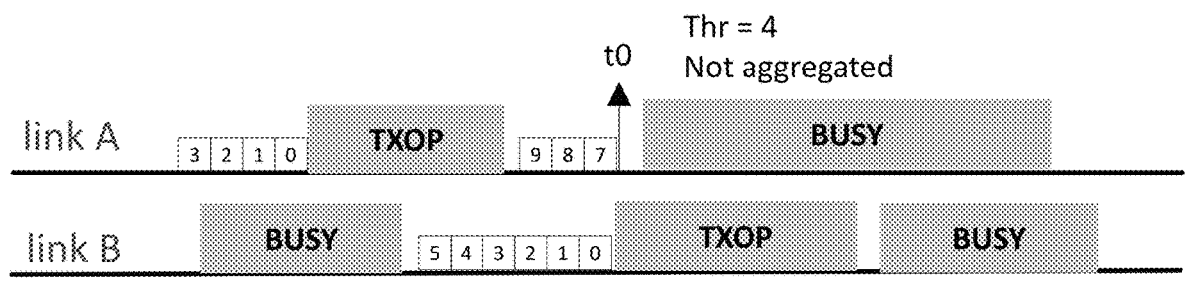
FIG. 10 illustrates the effect of aggregation threshold in preventing TXOP aggregation and improving fairness in the multi-link BSS, according to some embodiments of the present disclosure.

FIG. 10 illustrates the effect of aggregation threshold in preventing TXOP aggregation and improving fairness in the multi-link BSS, according to some embodiments of the present disclosure. FIG. 10 is illustrated from the perspective of a multi-link station, and TXOP indicates the transmission by the multi-link station and BUSY indicates other traffic on a link.

In the example of FIG. 10, the multi-link station contends for access on both links A and B after the channels become idle and has separate backoff countdowns running for each link. The backoff countdown for link B reaches zero prior to that for link A, and the multi-link station commences transmission on link B at time to. However, as the backoff countdown for link B (which is 7 at time t0) is not below the aggregation threshold (of, e.g., 4), the multi-link station does not aggregate link B and does not commence transmission on this link. In this example, the backoff countdown on link B may continue to countdown, however, another station wins the contention on link A, and this link becomes busy from the perspective of the multi-link station. Therefore, preventing aggregation in this scenario has increased fairness to other competing devices on link A.

According to some embodiments, the multi-link station performs a particular aggregated link backoff procedure to ensure fairness in channel access. In the baseline 802.11 spec, the typical backoff procedure after a successful transmission is to reset the contention window (CW) to the CW minimum parameter, which is advertised by the access point and to generate a new random count to which the backoff countdown is reset to. Performing this same operation for an aggregated link may lead to significant unfairness to single-link stations especially in a congested scenario. As used herein, the backoff countdown is a randomly selected number between 0 and a maximum value referred to as the contention window. The minimum contention widow value may depend on the access category, and the each link may have an independent contention window parameter for each access category. According to some example, each count of the countdowns may represent a single time slot, which may be about 9 µS or about 20 µS.

Thus, according to some embodiments, after a successful transmission on the aggregated link, the multi-link station does not reset the contention window and, instead, maintains the same contention window as prior to the transmission opportunity (TXOP) obtained through aggregation on the aggregated link. In some embodiments, the backoff countdown resumes from its value prior to TXOP aggregation, and in other embodiments, a new backoff countdown value is chosen (e.g., at random) for aggregated link. After a failed transmission on the aggregated links (e.g., due to another station winning contention), backoff procedure may behave in the same manner as existing 802.11 spec.

Figure 11A:
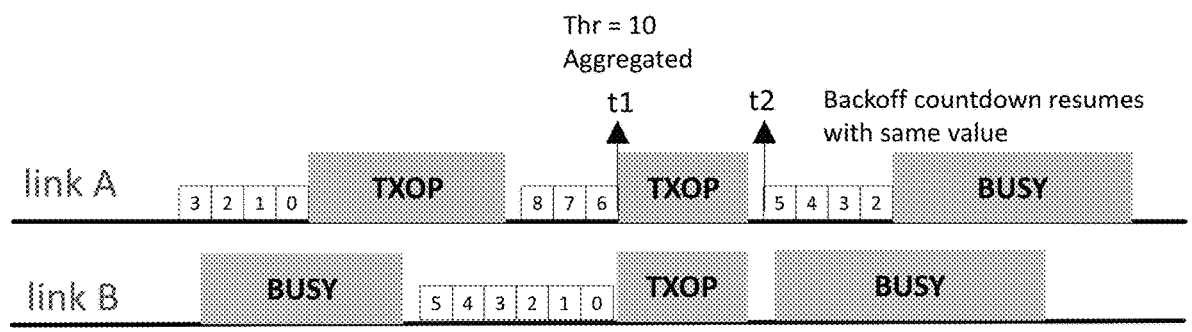
FIGS. 11A-11B illustrate the aggregated link backoff procedure performed by the multi-link station, according to some embodiments of the present disclosure.
Figure 11B:
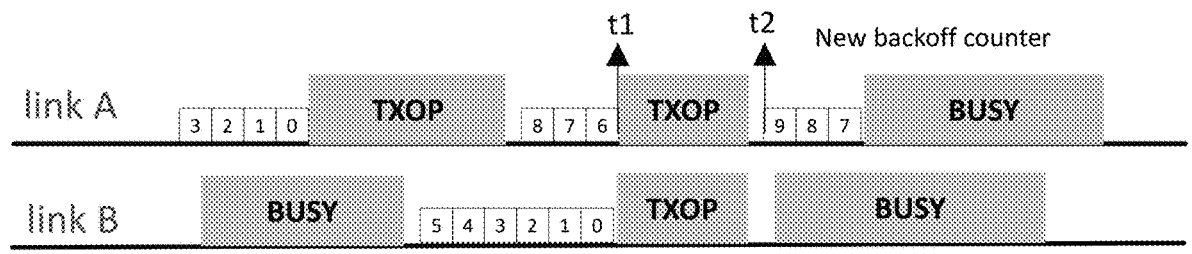

FIGS. 11A-11B illustrate the aggregated link backoff procedure performed by the multi-link station, according to some embodiments of the present disclosure. FIG. 11A illustrates the backoff countdown remaining the same after TXOP aggregation, and FIG. 11B illustrates the backoff countdown being reset to a new random count after TXOP aggregation.

Referring to FIGS. 11A-11B, the multi-link station contends for access on links A and B. At time t1, the backoff countdown on link B reaches zero, and the backoff countdown on link B is less than the aggregation threshold. Therefore, according to some embodiments, the multi-link station aggregates link A and simultaneously transmits on both channels. Referring to FIG. 11A, once the transmission on link A ends, at time t2, the multi-link station again contends for access to link A. In some embodiments, the backoff countdown resumes from its value prior to TXOP aggregation (e.g., 6). Referring to FIG. 11B, at time t2, the multi-link station selects a new random backoff countdown value with the same contention window as prior to the TXOP aggregation.

In a multi-link BSS, a scenario may be faced where single-link stations and legacy stations are predominantly operating on a particular link. To address fairness in this scenario, as an alternative to the aggregated link backoff procedure, some embodiments of the present disclosure impose a restriction on the aggregation of links. Henceforth, an unrestricted link represents the link that can be aggregated and a restricted link is the link that cannot be aggregated.

According to some embodiments, while in a restricted aggregation mode, the multi-link station limits aggregation to one direction. In other words, when the backoff countdown for a restricted link is down to zero, it can aggregate the unrestricted link if idle, and when the backoff countdown for an unrestricted link is down to zero, it cannot aggregate the restricted link even if the restricted link is idle. According to some embodiments, the access point determines which link is labeled as the restricted link and which is unrestricted, and broadcasts this to the intra-BSS stations through a beacon, for example.

Figure 12:
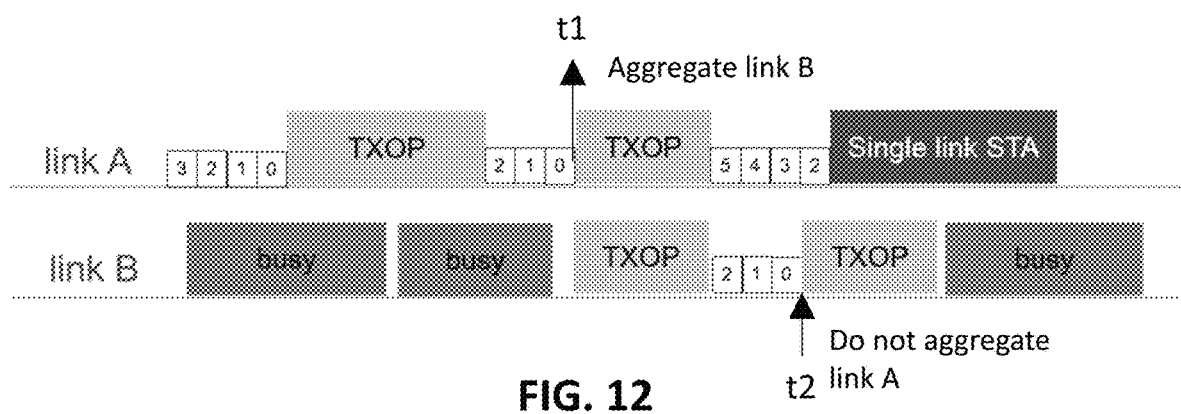
FIG. 12 illustrates the multi-link channel access operation in the restricted aggregation mode, according to some embodiments of the present disclosure.

FIG. 12 illustrates the multi-link channel access operation in the restricted aggregation mode, according to some embodiments of the present disclosure.

In FIG. 12, link A is predominantly operated by inter-BSS single-link and legacy stations. Accordingly, the access point has identified link A as the restricted link and link B as the unrestricted link. At time t1, backoff countdown for the restricted link A has reached zero, and the unrestricted link B is idle. Thus, in some embodiments, the multi-link station aggregates the unrestricted link B and simultaneously transmits on both channels. At time t2, the backoff countdown for the unrestricted link B has reached zero. However, as link A is restricted from being aggregated, the multi-link device does not aggregate link A, and only transmits on link B.

According to some embodiments, the multi-link TXOP aggregation process may be performed in conjunction with the 802.11's RTC/CTS (i.e., request-to-send/clear-to-send) mechanism.

Figure 13A:
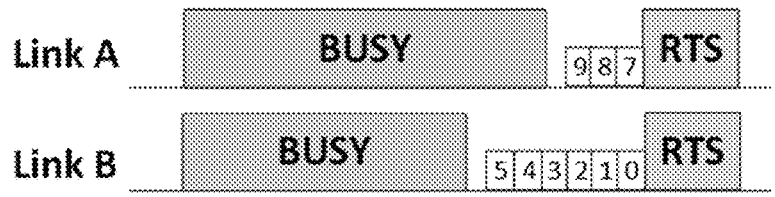
FIG. 13A illustrates an example scenario of multi-link TXOP aggregation with RTS-CTS handshaking, according to some embodiments of the present disclosure.
Figure 13B:
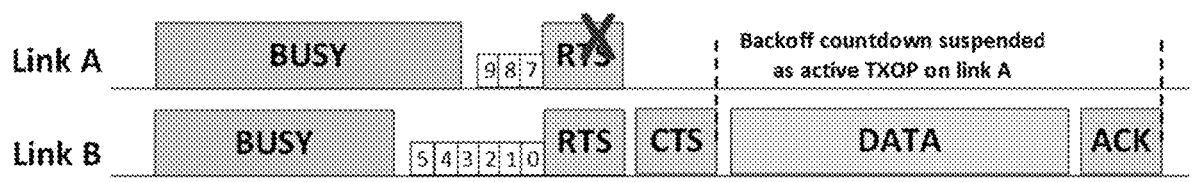
FIGS. 13B and 13C illustrate two different scenarios of TXOP aggregation when RTS on one of the link fails, according to some embodiments of the present disclosure.
Figure 13C:
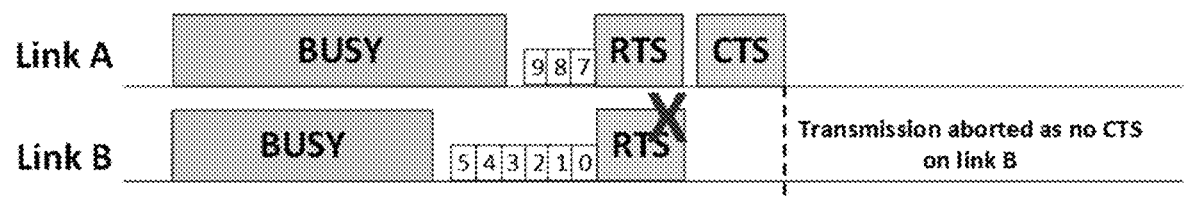

FIG. 13A illustrates an example scenario of multi-link TXOP aggregation with RTS-CTS handshaking, according to some embodiments of the present disclosure. FIGS. 13B and 13C illustrate two different scenarios of TXOP aggregation when RTS on one of the link fails, according to some embodiments of the present disclosure.

Referring to FIGS. 13A-13C, in some embodiments, a multi-link station (e.g., a non-STR STA) can aggregate RTS frames when the backoff countdown on one of the links on which the station is contending reaches zero, assuming the aggregated link is otherwise idle. In this example, link A is the aggregated link.

According to some embodiments, when the CTS frame is received on both links (e.g., from the access point), transmission is performed on both links. When the CTS frame is received only on the link on which backoff countdown was 0 (e.g., link B), then transmission is performed only on that link and the other link (e.g., link A) is not aggregated (see, e.g., FIG. 13B). Further, when the CTS is received only on the aggregated link (e.g., link A), then no transmission is performed (see, e.g., FIG. 13C). As data transmission will not be performed, CF-End may be transmitted on aggregated link to reset the NAV of all devices on the aggregated link and to inform said devices that they are free to contend for access on that channel. Regular backoff procedure applies on link B.

In the examples of TXOP aggregation provided above, the transmit opportunity (TXOP) on both the main link and the aggregated link are equal and fully aligned (i.e., start and end at the same time). In some examples, doing so may help to avoid collisions on the aggregated link with transmissions in the opposite direction. However, padding frames to align TXOPs may, in some cases, lead to inefficient multi-link utilization. To improve operational efficiency, according to some embodiments, the TXOP utilized on aggregated link can be smaller than the main link on which the backoff countdown became zero.

Figure 14A:
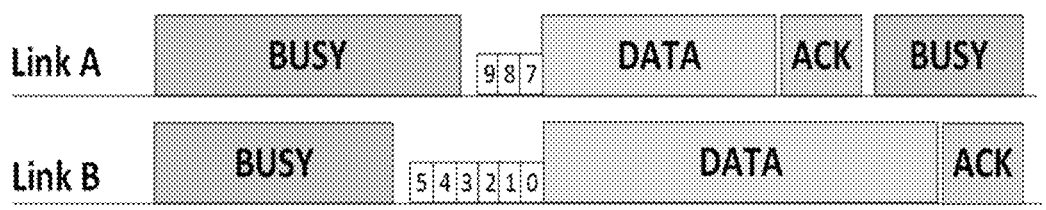
FIG. 14A illustrates TXOP aggregation without alignment in an STR STA case, according to some embodiments of the present disclosure.

FIG. 14A illustrates TXOP aggregation without alignment (e.g., without padding) in an STR STA case, according to some embodiments of the present disclosure. Here, there is per link acknowledgment by the receiving station or access point.

Figure 14B:
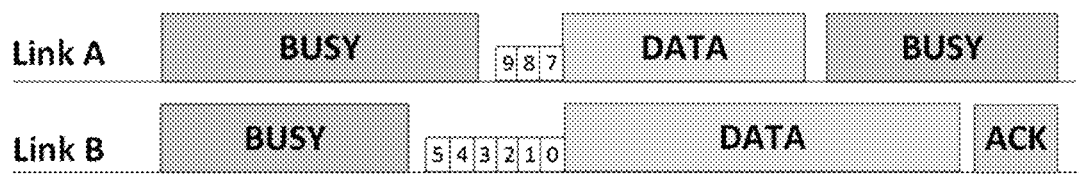
FIG. 14B illustrates TXOP aggregation without alignment in a non-STR STA case, according to some embodiments of the present disclosure.

FIG. 14B illustrates TXOP aggregation without alignment (e.g., without padding) in a non-STR STA case, according to some embodiments of the present disclosure. In the example of FIG. 14B, there is a unified acknowledgement on the link for which the backoff countdown was zero (e.g., link B), which serves as acknowledgment for both channels. Here, packet extension may be utilized to account for processing overhead in preparing the unified block acknowledgement on the main link. In some examples, when there is not enough time to process the received frames, packet extension may be employed, whereby the station does not send anything on the medium but also does not expect anything in response.

Figure 15:
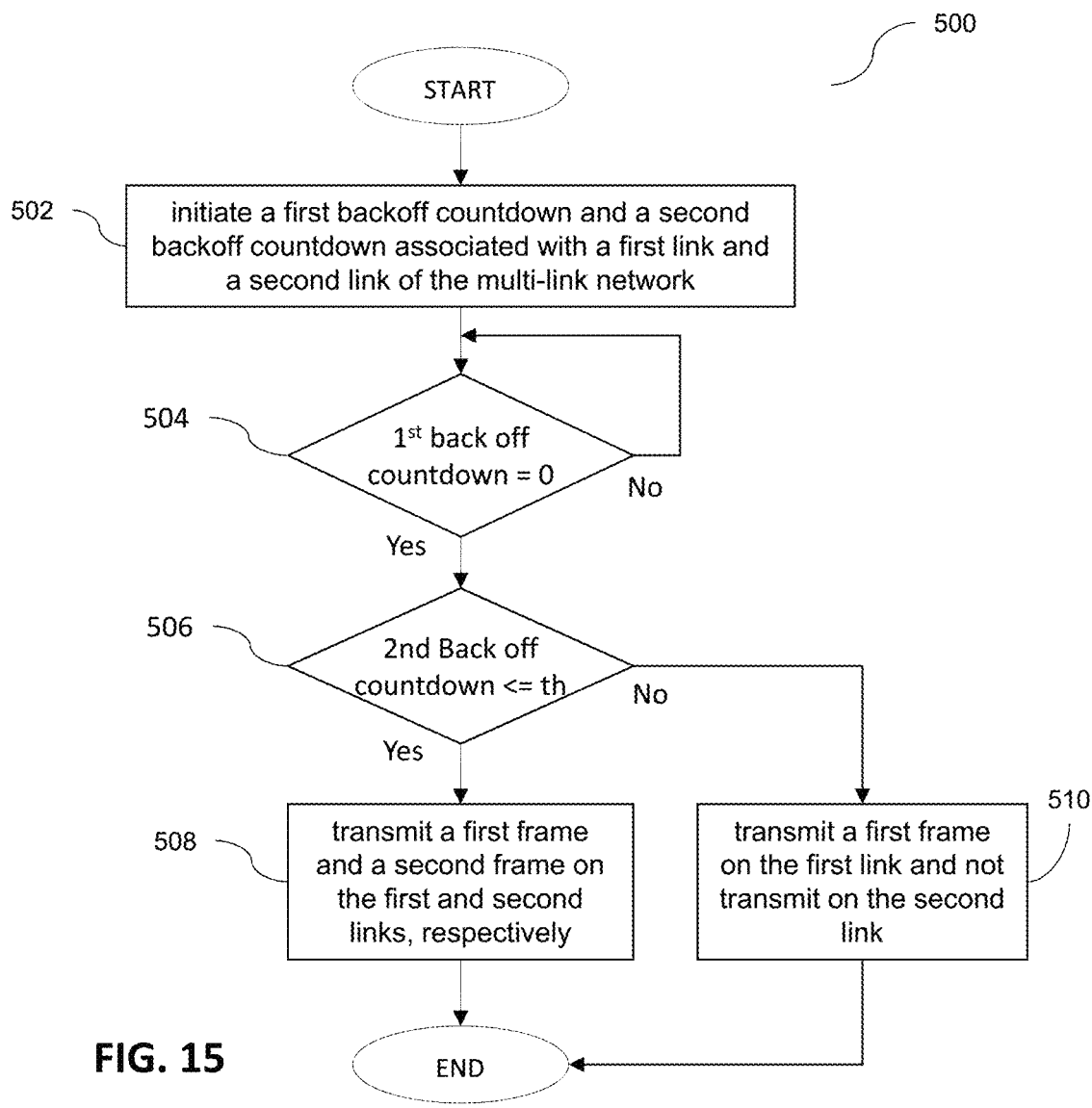
FIG. 15 illustrates a process of TXOP aggregation utilizing an aggregation threshold in a multi-link network, according to some embodiments of the present disclosure.

FIG. 15 illustrates a process 500 of TXOP aggregation utilizing an aggregation threshold in a multi-link network, according to some embodiments of the present disclosure.

In some embodiments, the multi-link station initiates a first backoff countdown and a second backoff countdown associated with a first link and a second link of the multi-link network, respectively (502). In response to the first backoff countdown reaching zero (504), the multi-link station determines whether the second backoff countdown is less than or equal to an aggregation threshold (506). In response to determining that the second backoff countdown is less than or equal to the aggregation threshold, the multi-link station transmits a first frame and a second frame on the first and second links (508). In response to determining that the second backoff countdown is greater than the aggregation threshold, the multi-link station transmits a first frame on the first link and does not transmit on the second links (510).

Figure 16:
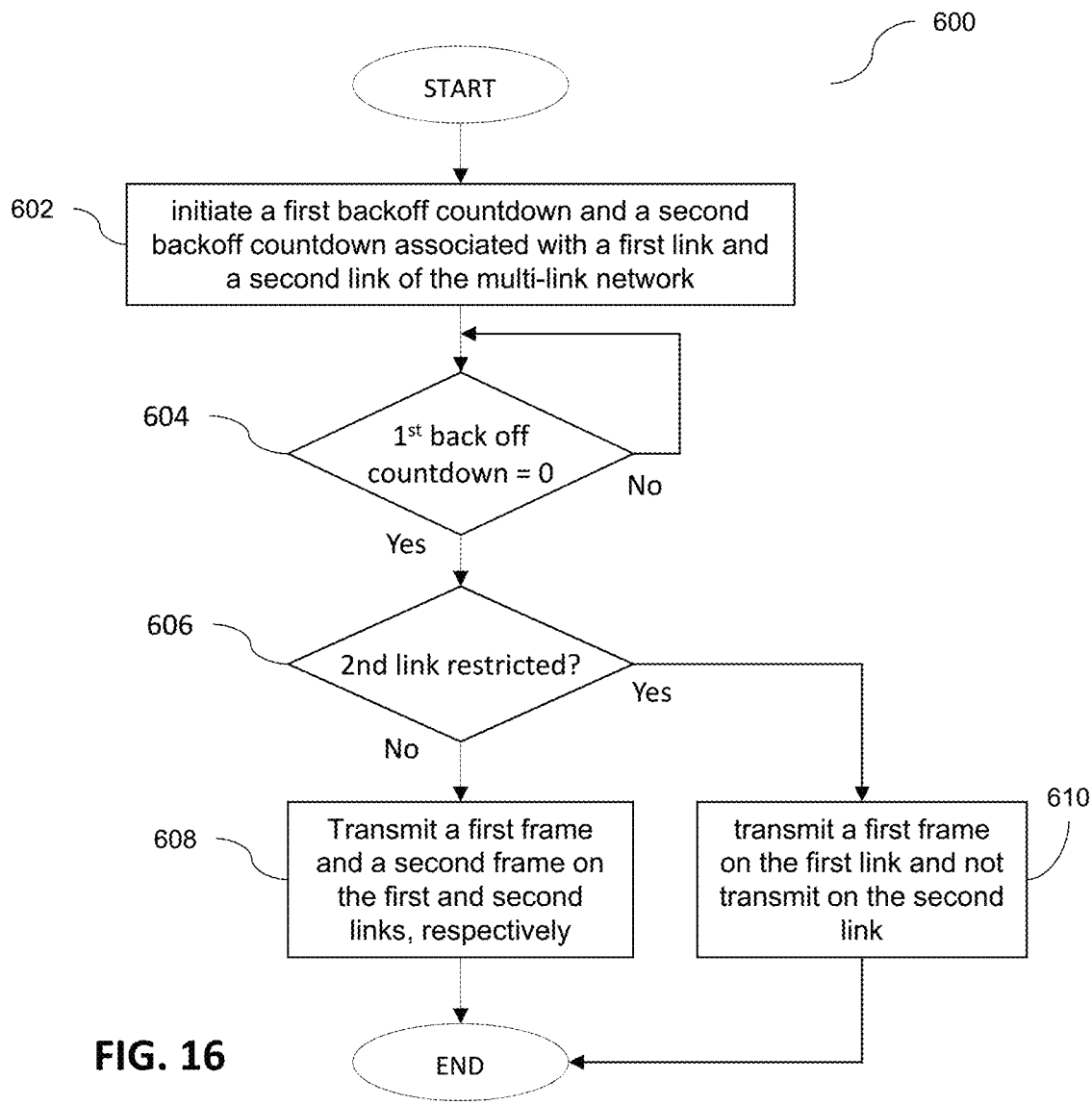
FIG. 16 illustrates a process of TXOP aggregation utilizing restricted and unrestricted links in a multi-link network, according to some embodiments of the present disclosure.

FIG. 16 illustrates a process 600 of TXOP aggregation utilizing restricted and unrestricted links in a multi-link network, according to some embodiments of the present disclosure.

In some embodiments, the multi-link station initiates a first backoff countdown and a second backoff countdown associated with a first link and a second link of the multi-link network, respectively (602). In response to the first backoff countdown reaching zero (604), the multi-link station determines whether the second link is restricted or unrestricted (606). In response to identifying the second link as the unrestricted link, the multi-link station transmits a first frame and a second frame on the first and second links (608). In response to identifying the second link as the restricted link, the multi-link station transmits a first frame on the first link and does not transmit on the second link (610).

Figure 17:
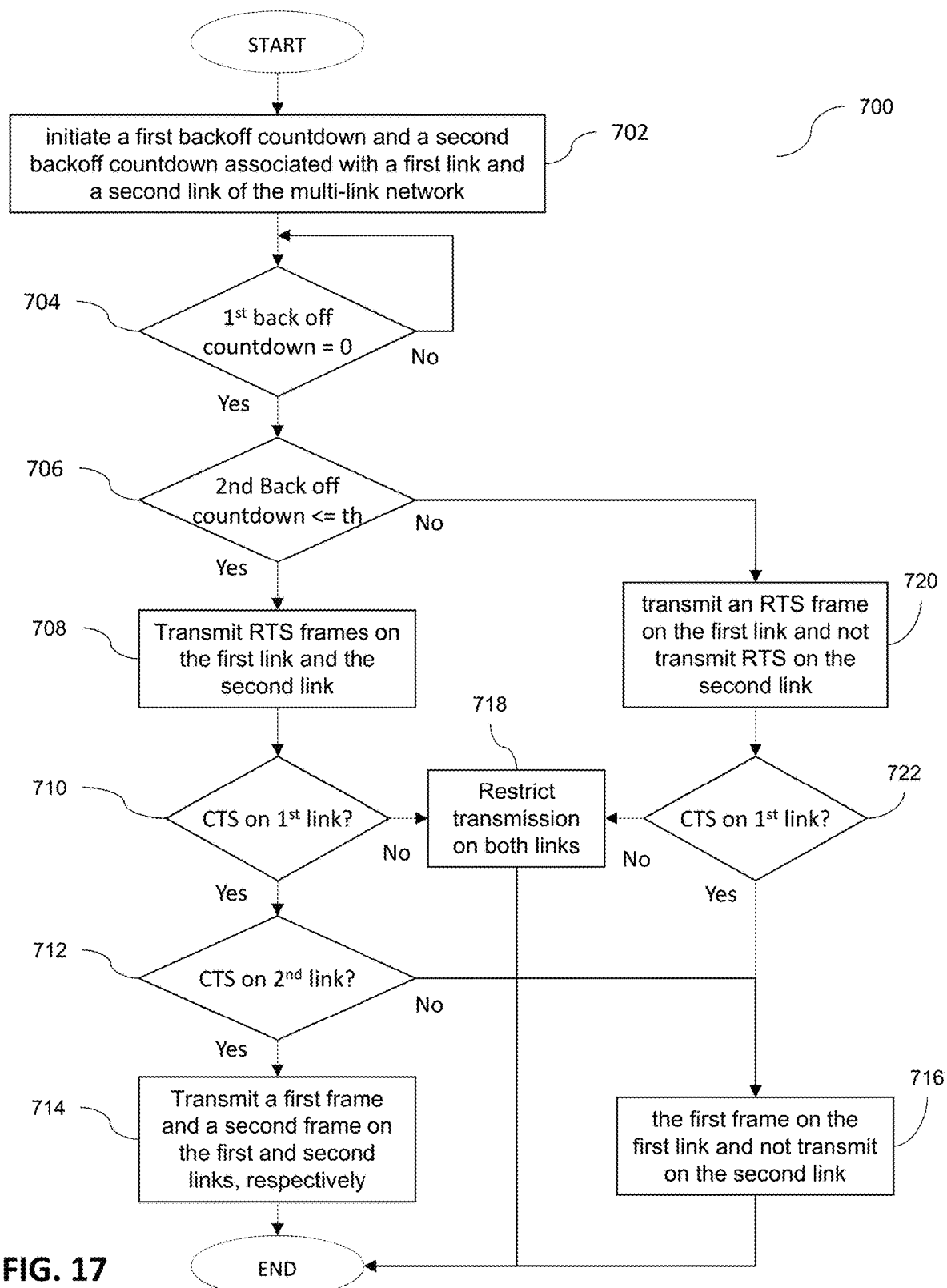
FIG. 17 illustrates a process of TXOP aggregation utilizing RTS-CTS handshaking in a multi-link network, according to some embodiments of the present disclosure.

FIG. 17 illustrates a process 700 of TXOP aggregation utilizing RTS-CTS handshaking in a multi-link network, according to some embodiments of the present disclosure.

In some embodiments, the multi-link station initiates a first backoff countdown and a second backoff countdown associated with a first link and a second link of the multi-link network, respectively (702). In response to the first backoff countdown reaching zero (704), the multi-link station determines whether the second backoff countdown is less than or equal to an aggregation threshold (706).

In response to determining that the second backoff countdown is less than or equal to the aggregation threshold, the multi-link station transmits RTS frames on the first and second links (708). The multi-link station then monitors the first and second links for receipt of a CTS frame on each (710 and 712). In response to receiving clear-to-send frames on both of the first and second links, the multi-link station transmits a first frame and a second frame on the first and second links, respectively (714). When a CTS frame is only received on the first link, the multi-link station transmits a first frame on the first link and does not transmit on the second links (716). When no CTS is received on any of the links, the multi-link station restricts/cancels transmission on both links (i.e., does not send frames on either link) (718).

In response to determining that the second backoff countdown is greater than the aggregation threshold, the multi-link station transmits an RTS frame only on the first link (and not on the second link) (720). When a CTS is received on first link (722), the multi-link station transmits a first frame on the first link and does not transmit on the second links (716). When no CTS is received on the first link, the multi-link restricts/cancels transmission on both links (i.e., does not send frames on either link) (718).

Generally, a multi-link access point establishes a BSS on multiple links distributed over multiple bands. During the setup phase (e.g., during the association phase), an interested station provides information about its STR capability to the access point of the BSS and performs multi-link Setup on a subset of links operated by the multi-link access point. This STR capability may be independent (e.g., different) for each pair of links due to the different separation of frequencies and spectrum locations. STR capability on a link pair may depends on channel design, implementation, and operation. Channel design may, for example, include channel separation, operating bandwidth on each channel, bands of operation, antenna distribution across links (e.g., all antennas for all links, separate antennas per link, etc.), and/or the like.

Table 1 illustrates a database of the STR capability information of the different multi-link stations stored at the access point, according to some embodiments of the present disclosure.

TABLE 1

| Station | Setup Links | Enabled Link Set | STR Capability Info of Station at Access Point |
| --- | --- | --- | --- |
| STA 1 | {A, B, D} | {A, B} | {A-B: STR} |
| STA2 | {A, B, C} | {A, B, C} | {A-B:STR, B-C: Non-STR, A-C:STR} |

In the example of Table 1, the setup links for each station indicate the links that are setup by the station during initial association with the access point. Over time, and in a dynamic manner, only a subset of the setup links may be enabled for frame exchange (e.g., to save power). An example of the setup and enabled links are shown in Table 1. The database also maintains the STR capability of each pair of enabled links for each station in the BSS.

As the mode of operation and the channels available to a station may change over time, the STR capability of the station may dynamically change over time.

According to some embodiments, the multi-link station has the capability of indicating any change in its support for simultaneous transmit and receive (STR) operation for a pair of enabled/setup links even after initial multi-link setup. In some examples, this mechanism is similar to the operating mode (OM) indication defined in the IEEE (Institute of Electrical and Electronics Engineers) 802.11ax standard, and may be achieved by defining a new field similar to the 802.11 ax OM control. Without this capability, the multi-link station would have to tear down the multi-link setup and re-do the entire setup with updated support for STR operation, which would lead to significant overhead and disruption in multi-link operation. This capability facilitates fast transition of multi-link stations from STR mode to non-STR mode and vice versa. In some examples, this update of any pair of enabled/setup links by the multi-link stations shall be allowed to perform on any of the enabled links.

Multi-link channel access mode may be independent for each link pair and, for the same pair of links, the STR capability can vary among the multi-link stations operating on this link pair. The access point may be capable of selecting the multi-link channel access mechanism for a link pair based on the STR capability of the associated multi-link stations operating on that link pair. According to some embodiments, the access point has the flexibility to select the multi-link channel access mechanism in a time-variant manner and to advertise the selection via beacons. In some examples, this is similar to how the EDCA parameter set and MU EDCA parameter set are advertised in the beacons. As an example, for the multi-link BSS shown in FIG. 1, the access point can select the multi-link access mode for each link pair as shown in the below table.

TABLE 2

| Link Pair | Channel Access Mode |
| --- | --- |
| A - B | Aggregation enabled for all STAs |
| A - C | No Aggregation |
| B - C | Aggregation Enabled for only non-STR STAs |

In addition, in some embodiments, the access point is capable of enabling TXOP aggregation for certain type of stations or for certain traffic. For example, the access point may enable multi-link aggregation for non-STR STAs or for all stations.

Figure 18:
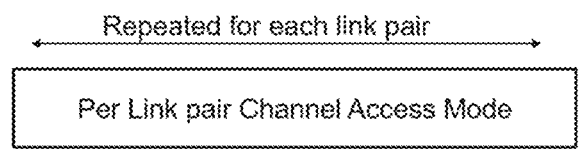
FIG. 18 illustrates the multi-link access mode advertisement frame that contains access mode definition for all link pairs, according to some embodiments of the present disclosure.

FIG. 18 illustrates the multi-link access mode advertisement frame that contains access mode definition for all link pairs, according to some embodiments of the present disclosure. In some embodiments, each link pair has a corresponding frame, which indicates the channel access mode for that link pair.

Accordingly, as provided above, embodiments of the present disclosure solve some of the issues presented with the introduction of multi-link operation in the current amendment of the IEEE 802.11 standard. Some aspects of the present disclosure are directed to enhancing medium utilization of non-STR STA in asynchronous multi-channel operation. Further aspects of the present disclosure are directed to improving fairness in medium access to non-STR and legacy stations in a multi-link network, in particular, in view of transmit opportunity aggregation by multi-link stations. As such, medium utilization by all stations within a network may improve, thus, improving overall network performance.

The operations performed by each of the stations and access point of the multi-link network may be performed by a "processing circuit" that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

It will be understood that, although the terms "first", "second", "third", etc., may be used herein to describe various channels/links, elements, components, and/or sections, these elements, components, regions, layers and/or sections should not be limited by these terms. These terms are used to distinguish one channels/link, element, component, or section from another channels/link, element, component, or section. Thus, a first link, element, component, or section discussed below could be termed a second link, element, component, region, layer or section, without departing from the spirit and scope of the inventive concept.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

It will be understood that when an element or component is referred to as being "connected to", "coupled to", or "adjacent" another element or component, it can be connected to, coupled to, or adjacent the other element or component, or one or more intervening elements or component may be present. When an element or component is referred to as being "directly connected to", "directly coupled to", or "immediately adjacent" another element or component, there are no intervening elements or components present.

As used herein, the term "substantially," "about," and similar terms are used as terms of approximation and not as terms of degree, and are intended to account for the inherent variations in measured or calculated values that would be recognized by those of ordinary skill in the art. Further, a specific quantity or range recited in this written description or the claims may also encompass the inherent variations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

While the present invention has been illustrated and described with reference to the embodiments thereof, it will be apparent to those of ordinary skill in the art that various suitable changes in form and detail may be formed thereto without departing from the spirit and scope of the present invention, as defined by the following claims and equivalents thereof.

What is claimed is:

1. A method of providing multi-link operation channel access in a multi-link network, the method comprising:
   initiating a first backoff countdown and a second backoff countdown associated with a first link and a second link of the multi-link network, respectively; and in response to the first backoff countdown reaching zero,
    determining whether the second backoff countdown is less than or equal to an aggregation threshold; and
    in response to determining that the second backoff countdown is less than or equal to the aggregation threshold,
        suspending the second backoff countdown;
        transmitting a first frame and a second frame on the first and second links; and
        resuming the second backoff countdown after completion of transmission on the second link.

2. The method of claim 1, further comprising:
determining that the first and second links are idle.

3. The method of claim 1, further comprising:
maintaining a contention window of the second link the same as that prior to transmitting the second frame.

4. The method of claim 1, wherein the first and second frames have time-aligned start and end times.

5. The method of claim 1, further comprising:
padding a shorter one of the first and second frames to equalize frame durations of the first and second frames.

6. The method of claim 1, further comprising:
receiving the aggregated threshold from an access point of the multi-link network.

7. The method of claim 1, wherein at least one of the first and second frames comprises an encapsulation of a physical header, one or more MAC headers, and one or more data payloads.

8. A method of providing multi-link operation channel access in a multi-link network, the method comprising:
    initiating a first backoff countdown and a second backoff countdown associated with a first link and a second link of the multi-link network, respectively; and
    in response to the first backoff countdown reaching zero,
        determining whether the second backoff countdown is less than or equal to an aggregation threshold; and
        in response to determining that the second backoff countdown is less than or equal to the aggregation threshold,
            suspending the second backoff countdown;
            transmitting a first frame and a second frame on the first and second links; and
            generating a new start value for the second backoff countdown,
            wherein the new start value is a random value less than a contention window of the second link.

9. A method of providing multi-link operation channel access in a multi-link network, the method comprising:
    initiating a first backoff countdown and a second backoff countdown associated with a first link and a second link of the multi-link network, respectively; and
    in response to the first backoff countdown reaching zero,
        determining whether the second backoff countdown is less than or equal to an aggregation threshold; and
        in response to determining that the second backoff countdown is less than or equal to the aggregation threshold,
            suspending the second backoff countdown;
            transmitting a first frame and a second frame on the first and second links; and
        in response to determining that the second backoff countdown is greater than the aggregation threshold,
            transmitting a first frame on the first link and not transmitting on the second link.

* * * * *